United States Patent
Ishitoya et al.

(10) Patent No.: US 6,776,182 B2
(45) Date of Patent: Aug. 17, 2004

(54) SEALING STRUCTURE OF STOP VALVE

(75) Inventors: Akihiro Ishitoya, Sashima-gun (JP);
Takashi Fujimaki, Nagoya (JP);
Kimiyasu Kimura, Nagoya (JP);
Kenichi Ito, Nagoya (JP)

(73) Assignee: Kyosan Denki Co., Ltd., Sashima-gun (JP)

( * ) Notice: Subject to any disclaimer, the term of this patent is extended or adjusted under 35 U.S.C. 154(b) by 24 days.

(21) Appl. No.: 10/281,147

(22) Filed: Oct. 28, 2002

(65) Prior Publication Data

US 2003/0079776 A1 May 1, 2003

(30) Foreign Application Priority Data

Oct. 30, 2001 (JP) ........................................ 2001-333570

(51) Int. Cl.[7] .............................................. F16K 24/04
(52) U.S. Cl. ...................................... 137/202; 251/357
(58) Field of Search ........................... 137/202; 251/357

(56) References Cited

U.S. PATENT DOCUMENTS 4,982,757 A * 1/1991 Ohasi et al. ................ 137/202

FOREIGN PATENT DOCUMENTS

JP  U 50-134119   4/1974

\* cited by examiner

Primary Examiner—Gerald A. Michalsky
(74) Attorney, Agent, or Firm—Oliff & Berridge, PLC

(57) ABSTRACT

A stop valve which is fitted with a cylindrical supporting portion is comprised of a ring-shaped rigid axial portion, a ring-shaped platy bendable valve portion extending outward, and a sealing lip portion extending inward. The sealing lip portion has a first sealing lip which extends obliquely upward from the rigid axial portion and has a semi-circular seal effecting face provided at an edge thereof, and a second sealing lip which extends obliquely downward from the rigid axial portion and has a semi-circular seal effecting face provided at an edge thereof. The first and second sealing lips have an extending portion which connects the edge seal effecting face with the rigid axial portion and has substantially a same thickness as a diameter of the semi-circular shape.

8 Claims, 5 Drawing Sheets

US 6,776,182 B2

SEALING STRUCTURE OF STOP VALVE

INCORPORATION BY REFERENCE

The disclosure of Japanese Patent Application No. 2001-333570 filed on Oct. 30, 2002 including the specification, drawings and abstract is incorporated herein by reference in its entirety.

BACKGROUND OF THE INVENTION

1. Field of the Invention

The invention relates to a stop valve for closing a fluid passage, more particularly, to a sealing structure of a stop valve with improved sealing performance in closing an opening portion by means of a float.

2. Description of the Related Art

Various kinds of stop valves have been used in various fields for closing fluid passages. In an automobile fuel tank for example, the opening portion which opens inside and outside of the fuel tank has a member provided with a valve body for detecting fuel reaching the opening portion. Consequently, if a vehicle tilts or falls down and thereby the fuel in the fuel tank reaches the opening portion, the member is activated so that the opening portion is closed by the stop valve.

Various kinds of such stop valves have been used. An example of known technology of such a valve is disclosed in Japanese Utility Model Application Laid-Open No.SHO50-134119. The valve is provided with, as shown in FIG. 2A, a valve seat portion 33 having an opening 32 disposed in a fluid passage 31 and a diaphragm 34 disposed facing the opening 32. A valve supporting rod 35 is attached to the diaphragm 34 and a ring-shaped planar valve body 36 is attached to the valve supporting rod 35. Consequently, the diaphragm is pressed by a fluid flowing into the fluid passage 31a, that is a primary pressure, and moves the valve body 36 and the valve supporting rod 35. Then, the valve seat portion 33 is pressed by a surface 37 of the valve body 36 so as to close the opening 32 thereby preventing the fuel from flowing out.

The valve body 36 is made of elastic material. While the valve is not activated, there is provided a gap d, as shown in FIG. 2B, between a back face 38 of the valve body 36 and a top end face 40 of a step portion 39 of the valve supporting rod 35. When the valve is activated as described above and as shown in FIG. 2C, the valve seat portion 33 is pressed by the surface 37 of the bendable valve body 36 so that the opening 32 is securely closed.

A stop valve 41 shown in FIG. 3A is another example of known stop valves. The stop valve 41 has a valve body fixed on a float, in which a passage closing member 42 is provided in a fluid passage leading from the fluid tank to the outside thereof, and a valve seat body 45 having an opening 44 fixed on a frame 43 of the passage closing member 42. A float 47 is disposed in a float guide 46 of the frame 43 such that the float 47 is movable vertically and that the float 47 is supported by the center hole portion of a ring-shaped planar valve body 49 fitted with a valve body supporting portion 48 on the top end portion of the float 47.

In the stop valve 41 provided with the aforementioned float 47, if a fluid is likely to flow out upward through the opening 44 of the valve seat body 45, the float 47 is pulled by the fluid toward the opening side, and thereby a surface 50 of the ring-shaped planar valve body 49 contacts with a ring-shaped sealing protrusion 51 formed on a bottom end portion in the circumference of the opening of the valve seat body 45, thereby closing the opening 44.

As shown in FIG. 3B, the valve body 49 is comprised of a rigid axial portion 52 which is fitted with the valve supporting portion 48 of the float 47, and a ring-shaped planar bendable valve portion 53 which extends outward from the rigid axial portion 52. The rigid axial portion 52 is formed thicker than the bendable valve portion 53, therefore, even when the rigid axial portion 52 is located at the bottom end portion of the valve supporting portion 48 of the float 47 as shown in FIG. 3B, a gap d is provided in a usual condition between the back face of the bendable valve portion 53 and the top end face 54 of the float 47.

In the valve body 49 of such a stop valve of float-actuating type having the aforementioned structure, when the valve is closed as mentioned above, the sealing protrusion 51 of the valve seat body 45 relatively pushes down the surface 50 of the valve body 49 by floating force of the float, thus the bendable valve portion 53 can be bent at least within the gap d and thereby the valve sealing is secured the same as in the valve body shown in FIG. 2.

FIG. 4A shows a stop valve of float-actuating type described above, provided with an improved valve body 55. The valve body 55 has a float sealing portion 57 having three sealing lips as described in the figure, provided particularly on an inner circumference face of the rigid axial portion 56. FIG. 4B shows a partially enlarged view of the valve body 55 installed on a float 58. A center lip 59 located as the center of three sealing lips is formed thicker than other two lips while an upper lip 60 located above the center lip 59 in FIG. 4B is formed thinner than the center lip 59. The upper lip 60 has the shape of a lower half part of the center lip in the example shown in FIG. 4B, therefore the upper lip 60 is a half of the center lip 59 in the thickness. Likewise, a lower lip 61 located under the center lip 59 in the figure has the shape of an upper half part of the center lip 59 thus is a half of the center lip 59 in thickness.

In a stop valve as shown in the aforementioned FIG. 3, a fluid tends to flow out through a gap between the valve body and the float. However, such flowing out can be prevented by forming a valve body into a three-lip shape which can seal the gap by each of the lips. This sealing structure can secure long-term sealing stability at the sealing portion.

To install the valve body of the stop valve, having the aforementioned sealing lips, onto the valve supporting portion 62 of the float 58, a stopper portion 64 of the valve supporting portion 62 is fitted into a center opening 63 of the valve body. The stopper portion 64 is formed on the top end portion of the valve supporting portion 62 and is larger than the valve supporting portion 62 in diameter. In installation such as in automated machine assembly using jigs for example, the sealing lip may be installed in such a posture as the edge is bent due to the friction or other reasons. This may be caused because the edge of the upper lip 60 touches over the back face of the stopper portion 64 until the valve body is completely installed and the center opening 63 is attached onto a predetermined position shown in FIG. 4B, through the stopper portion 64 having a larger diameter as mentioned above.

In another example shown in FIG. 4D, the lower lip 61 may also be installed in such a posture as the edge of the sealing lip bent, not extended completely straight, due to the friction or other reasons that may be caused when the valve body is installed onto a predetermined position shown in FIG. 4B, because the edge of the lower lip 61 presses the surface of the valve supporting portion 62 by elastic force of the valve body, during the lower lip 61 is sliding on the surface of the valve supporting portion.

If the valve body is installed in such a posture as the edge of the sealing lip bent, a predetermined sealing performance each of the sealing lips should exert may not be achieved, and a defect product with bad sealing performance may happen. It would be required therefore to inspect installation failure after installation is finished, however it bothers a lot of time and labor.

Additionally, manual installation may be considered to eliminate such a failure caused in mechanical installation, however, in installing the valve body into such a proper posture as shown in FIG. 4B, a great deal of attention as well as sufficient experience is required, thereby causing product price increase.

The aforementioned problem may be caused also in other cases, not only in the examples mentioned above. The same problem may occur in installation of such a stop valve as the center opening of an intermediate body is to be fitted with the valve supporting member and at the same time a sealing lip is formed on the center opening side.

SUMMARY OF THE INVENTION

Accordingly, it is an object of the invention to provide a sealing structure of a stop valve, which prevents the sealing lips from being installed in such a posture as any one of them is bent when the center opening of the valve body having sealing lips is fitted with the valve supporting member of the stop valve.

According to a first aspect of the invention, a stop valve is comprised of: a ring-shaped rigid axial portion; a flat platy bendable valve portion formed thinner than the rigid axial portion and extending outward from the rigid axial portion; and a sealing lip portion extending inward to the rigid axial portion. The sealing lip portion has a first sealing lip and a second sealing lip. The first sealing lip has an extending portion having an axis which extends inward from the rigid axial portion and upward from the bendable valve portion such that it intersects the extending direction of the bendable valve portion. At the edge of the extending portion of the first sealing lip portion, a first seal effecting face of substantially semi-circular shape being contact with an outer circumference face of the supporting portion is formed. The thickness of the extending portion is substantially the same as the diameter of the semi-circular shape of the first seal effecting face. The second sealing lip has an extending portion having an axis which extends inward from the rigid axial portion and downward from the bendable valve portion such that it intersects the extending direction of the bendable valve portion. At the edge of the extending portion of the second sealing lip portion, a second seal effecting face of substantially semi-circular shape being contact with an outer circumference face of the supporting portion is formed. The thickness of the extending portion is substantially the same as the diameter of the semi-circular shape of the second seal effecting face.

According to a second aspect of the invention, a stop valve which is fitted with a cylindrical supporting portion, comprises a ring-shaped rigid axial portion, a platy bendable valve portion formed thinner than the rigid axial portion and extending outward from the rigid axial portion, and a sealing lip portion extending inward from the rigid axial portion. The sealing lip portion comprises a first sealing lip which extends inward from the rigid axial portion up to substantially a same horizontal plane as the top end face of the rigid axial portion and the outer circumference face of the supporting portion, and a second sealing lip which extends inward from the rigid axial portion up to substantially a same horizontal plane as the bottom end face of the rigid axial portion and the outer circumference face of the supporting portion. The each sealing lip comprises a substantially semi-circular seal effecting face provided at an edge thereof and an extending portion having substantially a same thickness as a diameter of the semi-circular shape, connecting the seal effecting face and the rigid axial portion.

BRIEF DESCRIPTION OF THE DRAWINGS

FIG. 1B is a sectional view of a part of the valve body.

FIG. 2A is a sectional view showing the entire structure including a member on which the stop valve is installed, FIG. 2B is an enlarged sectional view of the surrounding portion of the valve body, and FIG. 2C is an enlarged sectional view showing a state in which an opening of the stop valve is closed by the stop valve.

FIG. 3A is a sectional view showing the entire structure including a member on which the stop valve is installed, and FIG. 3B shows a state in which an opening of the stop valve is closed by the valve body.

FIG. 4A shows a sectional view of a float-actuating type stop valve, FIG. 4B shows a sectional view of the valve body installed on a float, FIG. 4C shows a state in which the upper lip is installed in such a posture as the edge of the sealing lip is bent by a back face of the stopper portion, and FIG. 4D shows a state in which the lower lip is installed in such a posture as the edge of the sealing lip is bent.

DETAILED DESCRIPTION OF PREFERRED EMBODIMENTS

Figure 1A:
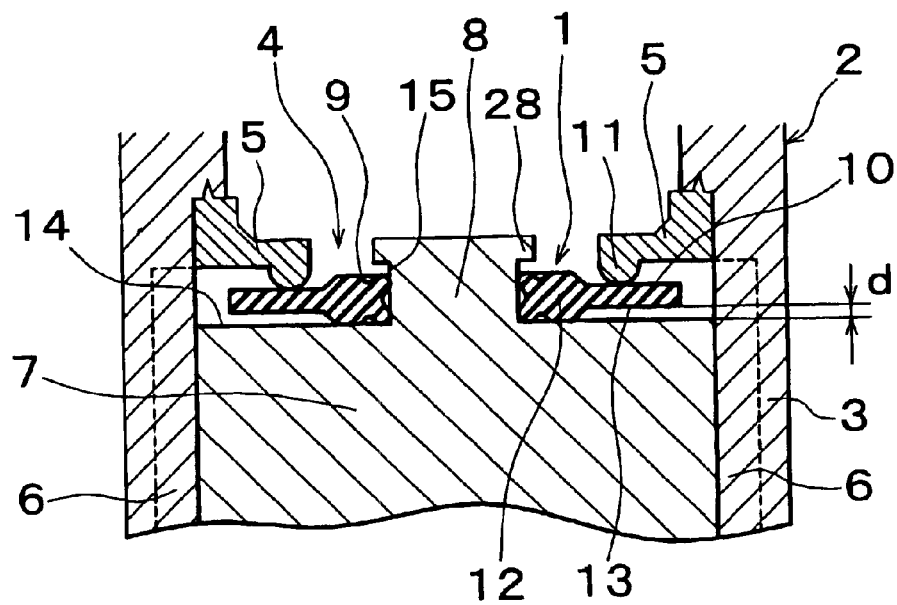
FIGS. 1A and 1B are sectional views of the stop valve, a float for fixing the valve body and a peripheral member according to an embodiment of the invention.
Figure 1B:
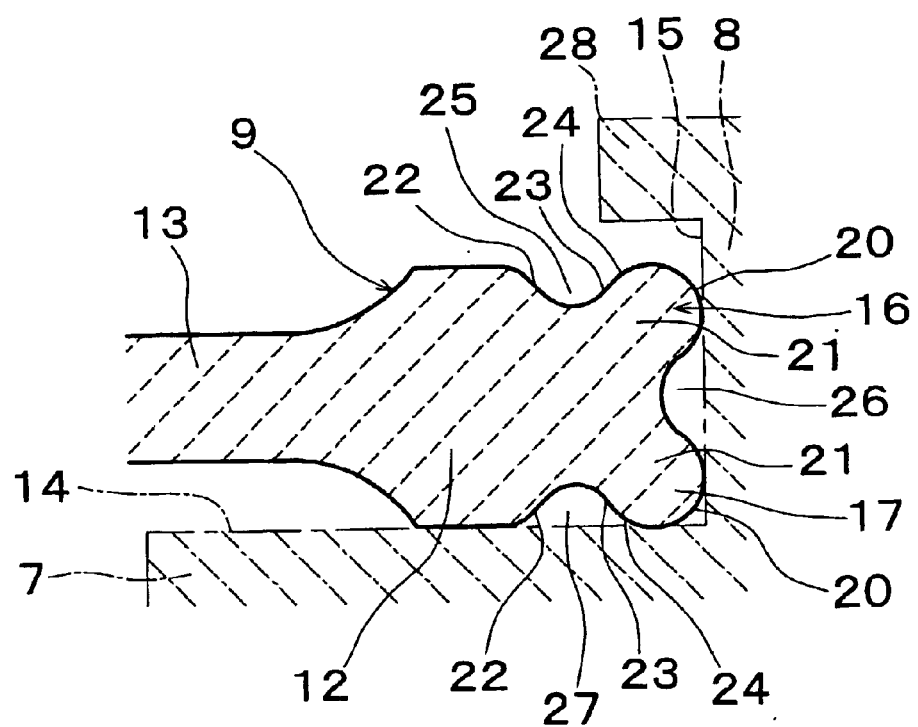
Figure 2A:
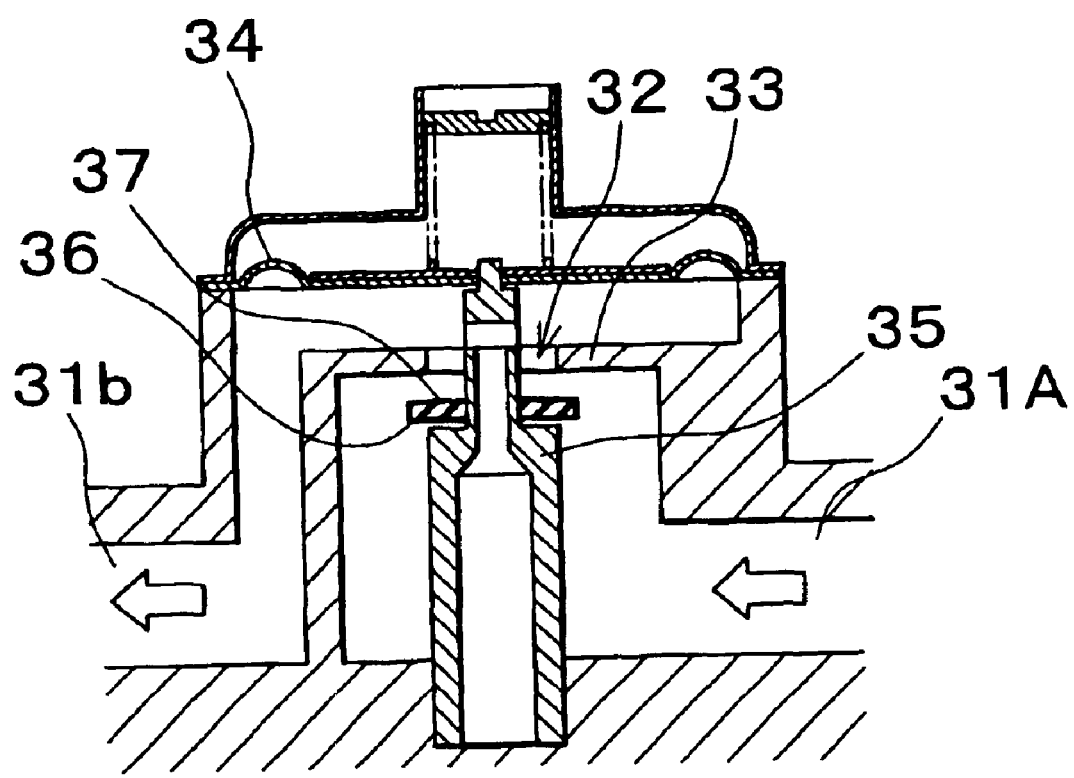
FIGS. 2A, 2B and 2C show the stop valve of a related art of the invention, more particularly.
Figure 2B:
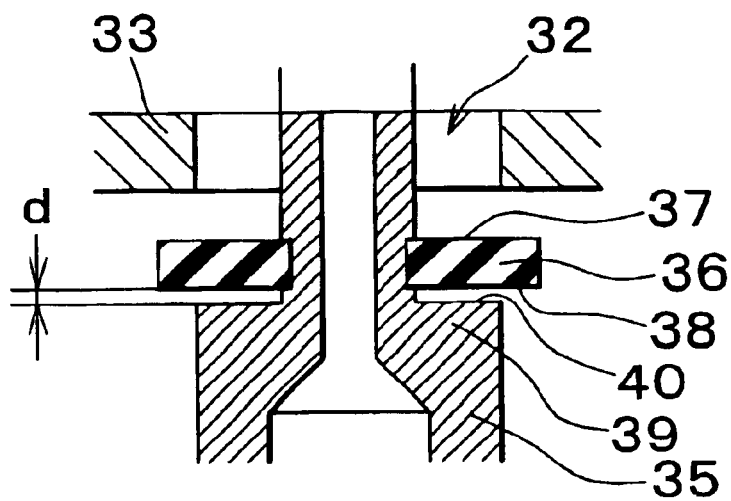
Figure 2C:
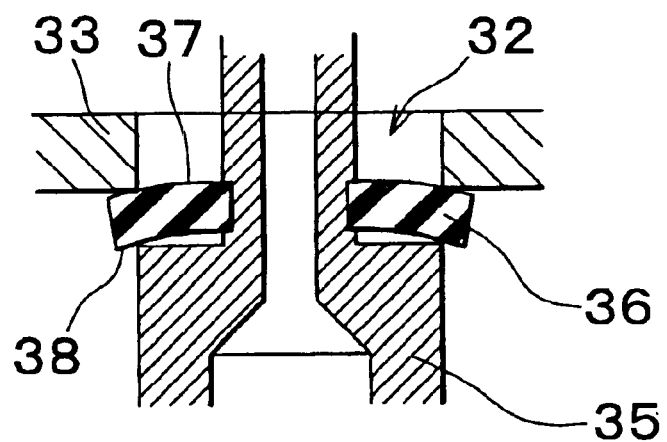
Figure 3A:
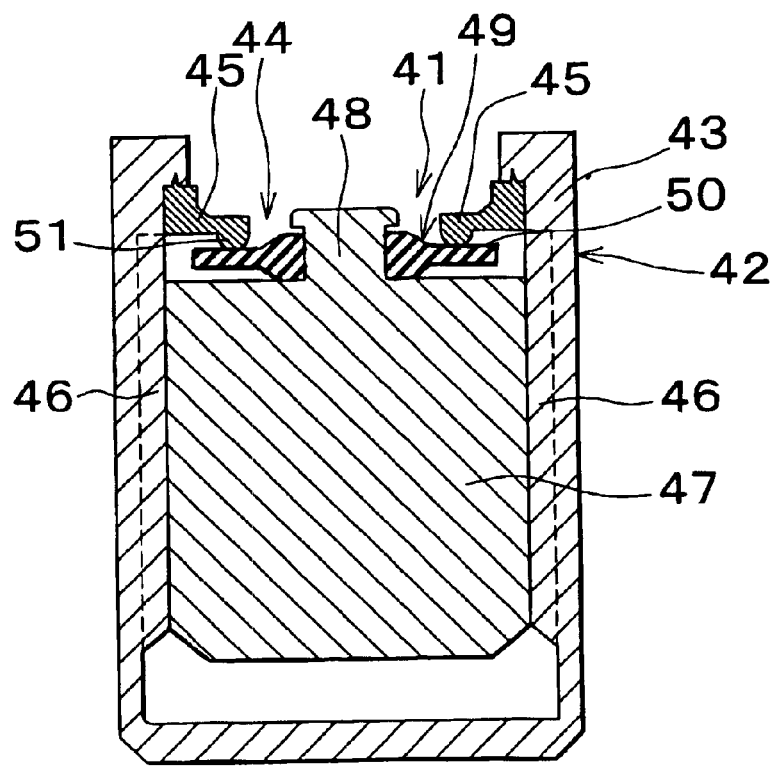
FIGS. 3A and 3B show another stop valve of the related art of the invention, more particularly.
Figure 3B:
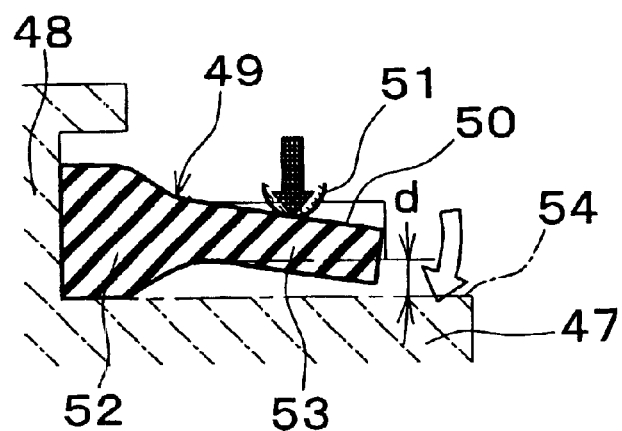
Figure 4A:
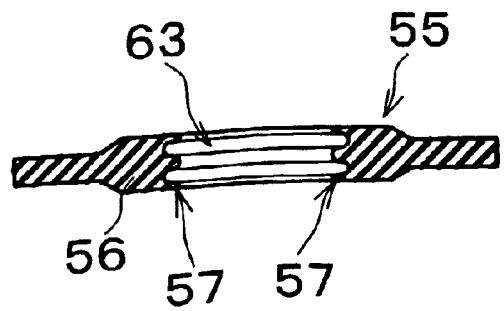
FIGS. 4A, 4B, 4C and 4D show the stop valve of a related art of the invention, more particularly.
Figure 4B:
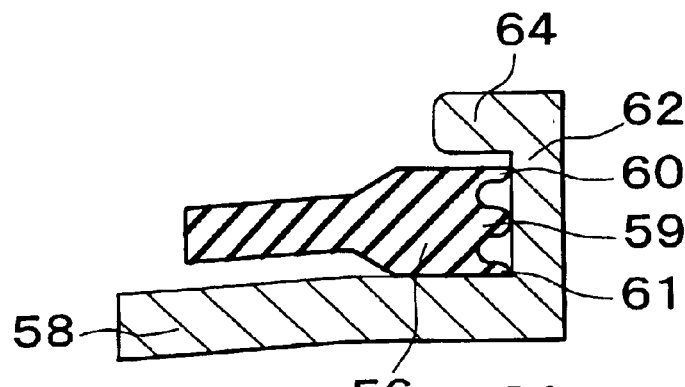
Figure 4C:
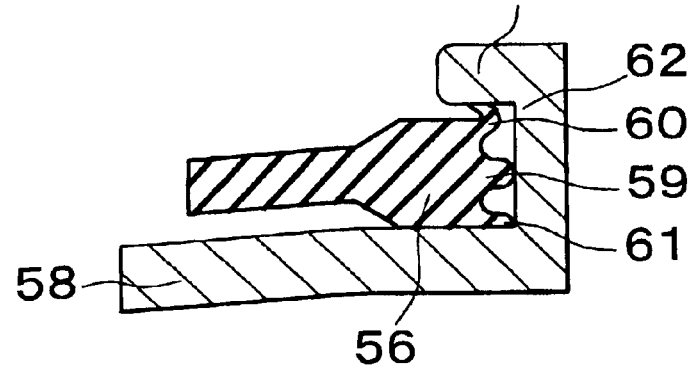
Figure 4D:
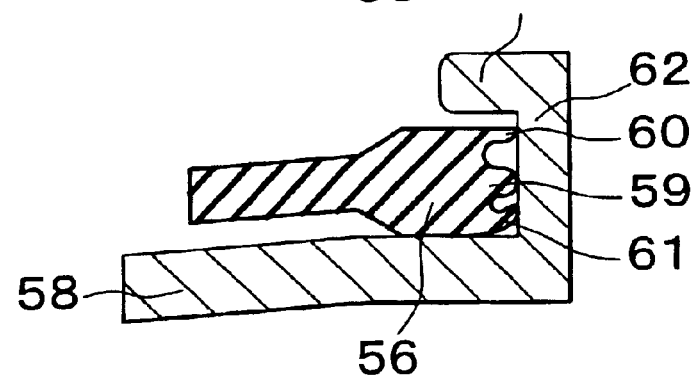

Preferred embodiments of the invention will be described with reference to the accompanying drawings. FIGS. 1A and 1B show a stop valve 1. FIG. 1A is a sectional view of a major part of the stop valve 1 in an embodiment where a stop valve of float-actuating type as shown in the aforementioned FIG. 3 is used. FIG. 1B is an enlarged sectional view particularly showing a float sealing portion of the stop valve.

In the stop valve 1 of the embodiment shown in FIG. 1, a valve seat body 5 in which an opening 4 is formed at the center thereof is fixed to a frame 3 of a passage closing member 2 disposed in a fuel passage leading from a fuel tank to the outside. A float 7 is disposed in a float guide 6 of the frame 3 such that the float 7 is freely movable vertically and that a valve body 9 of substantially ring-shaped planar shape is supported by a valve supporting portion 8, on the top end portion of the float 7, fitted into the center hole portion of the valve body 9.

In the stop valve 1 employing the above-described float 7, when fuel is likely to flow out upward through the opening 4 of the valve seat body 5, the float 7 is pulled up to the opening side by the fuel thereby a surface 10 of the ring-shaped planar valve 9 contacts with a ring-shaped sealing protrusion 11 formed on the bottom end portion in the circumference of the opening of the valve seat body 5, thereby closing the opening 4 same as in the example shown in the aforementioned FIG. 3. Meanwhile, FIG. 1A shows the opening 4 closed.

The brief description of the valve body 9 is same as shown in the aforementioned FIG. 4. The valve body 9 is comprised of a rigid axial portion 12 into which the valve supporting portion 8 of the float 7 is fitted, and a ring-shaped planar bendable valve portion 13 extending outward from the rigid axial portion 12. The rigid axial portion 12 is formed thicker than the bendable valve portion 13. Therefore, even when the rigid axial portion 12 is located at the bottom of the valve supporting portion 8 of the float 7, a gap d is provided in a usual condition between the lower face of the bendable valve portion 13 and the top end face 14 of the float 7. When the valve closing is activated, the surface 10 of the valve body 9 is relatively pressed by the sealing protrusion 11 of the valve seat body 5 due to the floating force of the float, so that the surface 10 of the valve body 9 is bent and the valve is securely sealed.

The stop valve 1 having the structure mentioned above is provided with two sealing lips which are disposed on the inner circumference side of the rigid axial portion 12 contact by pressure with the outer circumference face 15 of the valve supporting portion 8. As indicated in the enlarged diagram of FIG. 1B, the sealing lip consists of a first sealing lip 16 in the upper portion and a second sealing lip 17 in the lower portion in FIG. 1B. In this embodiment, the first sealing lip 16 and the second sealing lip 17 extending from the rigid axial portion 12 are shaped the same in vertically symmetric way, thus the valve body of the stop valve is formed vertically symmetric in this figure.

The structure of the sealing lip portion will be described in detail. As shown in FIGS. 1A and 1B, the first sealing lip 16 extends substantially 45° upward from the rigid axial portion 12 and the edge is formed as a seal effecting face 20 whose section is semi-circular shape A seal connecting portion 21 (extending portion) for supporting the seal effecting face 20 on the rigid axial portion 12 is provided in the sealing lip structure. Consequently, an upper concave portion 25 is formed of an inner oblique face 22 on the circumference face of the rigid axial portion 12, an outer face 23 of the seal connecting portion 21 and an outer side face 24 of the seal effecting face 20.

A center concave portion 26 is formed in a portion opposite the outer circumference face 15 of the valve supporting portion 8 in the valve body 9 and a lower concave portion 27 is formed between the rigid axial portion 12 and the surface of the second sealing lip 17 in the same structure as the upper concave portion 25 mentioned above. In other words, the valve body 9 has two sealing lips and three concave portions.

The float sealing portion of the stop valve according to the embodiment employs a structure in which the seal effecting face of semi-circular shape is provided at the edge, and the connecting portion which connects with the rigid axial portion in the thickness substantially equal to the diameter of the circular-shape portion. Accordingly, the float sealing portion has no thin lip seals such as included in the valve body of the stop valve shown in FIGS. 4A and 4B mentioned above. Therefore, if the valve body 9 is installed mechanically using jigs, sealing failures such as winding-in and ride-over of the sealing lips are prevented securely.

The valve body of the stop valve has two sealing lip portions comprised of the first sealing lip 16 and the second sealing lip 17, allowing the valve to be securely sealed. More particularly as shown in FIG. 1B, in a sealing condition where the valve body 9 is pressed onto the top end face 14 of the float 7, the second sealing lip 17 is attached onto the upper end face of the float 7 at the lower side portion of the seal effecting face 20 of semi-circular shape, thereby a fuel seepage from a gap between the rigid axial portion 12 and the upper end face of the float 7 can be prevented by this first sealing effect at this portion.

The inner side portion of the circular seal effecting face 20 of the second sealing lip 17 is in contact by pressure with the outer circumference face 15 of the valve supporting portion 8 so as to perform the second sealing effect for securely sealing fuel seepage from the aforementioned sealing portion. As the single sealing lip includes two seal effecting portions, three seals in total are formed in addition to the sealing effect of the first sealing lip 16 which will be described below, thus sealing effect, similar to the embodiment in FIG. 4 having three sealing lips, can be maintained.

The circular seal effecting face 20 of the first sealing lip 16 is in contact by pressure with the outer circumference face 15 of the valve supporting portion 8, and thereby in case of a fuel seepage through the sealing portions, the seepage is blocked at the contact portion. More particularly, as the center concave portion 26 is provided between the first sealing lip 16 and the second sealing lip 17, even if fuel seeps through the second sealing lip, the pressure is reduced at the center concave portion 26. Consequently, fuel does not reach directly the sealing portion of the first sealing lip 16 by the first pressure, thereby exert the sealing effect further securely.

Additionally, since each of the sealing lips is connected with the circular seal effecting face via the connecting portion and the rigid axial portion, each sealing lip portion can be rocked by the connecting portion, therefore it can be deformed corresponding to various shapes or sizes, thereby absorbing disparity in dimension of the products. Furthermore, in attaching the valve body, through a larger-diameter stopper portion 28 formed on the top end portion of the valve supporting portion 8, to the valve supporting portion 8, the elastic deformation of the valve body facilitates the attachment.

The rigid axial portion 12 secures the rigidness of the entire valve body despite each sealing lip deforms when the stop valve 1 is attached to the valve supporting portion 8 as mentioned above. Therefor, the rigid axial portion 12 prevents too much deformation of the entire valve body. The rigid axial portion 12 prevents failure effecting of the stop valve which may be caused by the bendable valve portion 13 warped upward or downward and deformed into a dish shape when the stop valve 1 is attached.

The sealing structure of the stop valve of the invention is comprised of the substantially semi-circular seal effecting face at the edge thereof, and the connecting portion for connecting the front-end seal effecting face with the rigid axial portion, having substantially the same thickness as the diameter of the semi-circular shape of the seal effecting face, thus no thin lip seals are provided. Therefore, even if the valve body is assembled by machinery automation using jigs, sealing failures such as winding-in and ride-over of the sealing lips can be securely prevented Furthermore, the valve body of the stop valve has two. sealing lip portions, the first and the second sealing lips, and thereby the sealing effect is secured. The substantially semi-circular effecting face can exert the sealing effect onto two faces intersecting at right angle, that is, onto two portions by a single sealing lip, thereby exerting further secure sealing effect.

Additionally, since each sealing lip has the rigid axial portion connected with the circular seal effecting face via the connecting portion, and thereby each sealing lip portion can rock by the connecting portion. Therefore, the sealing lip is deformable corresponding to various shapes or sizes thereby absorbing disparity in dimension of the products. Furthermore, if the valve body of the stop valve is required to attach to the valve supporting portion through a stopper portion of larger-diameter formed on the top end connection portion of the valve supporting portion, the elastic deformation of the valve body facilitates the attachment.

Since the stop valve is provided with the rigid axial portion, too much deformation of the entire valve body can be prevented by securing the rigidness of the entire valve body, despite each sealing lip is deformed when the valve body of the stop valve is attached to the valve supporting portion. As the result, failure effecting of the stop valve is prevented, which may be caused by the bendable portion warped upward or downward and deformed into a dish shape when the valve body is attached.

The first and the second sealing lips of the above-described embodiment are attached on the rigid axial portion contacting in the thickness, substantially the same as the diameter of the semi-circular shape of the edge of the sealing lips, sealing failure such as winding-in and ride-over of the sealing lips is prevented securely even if the sealing lips are mechanically installed using jigs.

What is claimed is:

1. A stop valve which is fitted with a cylindrical supporting portion, comprising:

a ring-shaped rigid axial portion;

a platy bendable valve portion formed thinner than the rigid axial portion and extending outward from the rigid axial portion; and a sealing lip portion extending inward from the rigid axial portion wherein;

the sealing lip portion has a first sealing lip and a second sealing lip, the first sealing lip has an extending portion having an axis which extends inward from the rigid axial portion and upward from the bendable valve portion such that the axis intersects the extending direction of the bendable valve portion, the extending portion of the first sealing lip portion has a first seal effecting face of substantially semi-circular shape, which is provided at an edge thereof and in contact with an outer circumference face of the supporting portion, and the extending portion is substantially the same in thickness as the diameter of the semi-circular shape, the second sealing lip has an extending portion having an axis which extends inward from the rigid axial portion and downward from the bendable valve portion such that the axis intersects the extending direction of the bendable valve portion, the extending portion of the second sealing lip portion has a second seal effecting face of substantially semi-circular shape, which is provided at an edge thereof and in contact with an outer circumference face of the supporting portion, and the extending portion is substantially the same in thickness as the diameter of the semi-circular shape.

2. The stop valve according to claim 1, wherein;

the extending portion of the first sealing lip and the extending portion of the second sealing lip are so formed that a gap is provided between extending portions of the first and second sealing lips and an outer circumference face of the supporting portion when the first seal effecting face and the second seal effecting face are in contact with the outer circumference face of the supporting portion.

3. The stop valve according to claim 1, wherein;

the top end face of the rigid axial portion is formed on substantially a same horizontal plane as the top end face of the extending portion of the first sealing lip.

4. The stop valve according to claim 3, wherein;

a concave portion is formed in the top end face of the rigid axial portion.

5. The stop valve according to claim 1, wherein;

the bottom end face of the rigid axial portion is formed on substantially a same horizontal plane as the bottom end face of the extending portion of the second sealing lip.

6. The stop valve according to claim 5 wherein;

a concave portion is formed in the bottom end face of the rigid axial portion.

7. A stop valve which is fitted with a cylindrical supporting portion, comprising:

a ring-shaped rigid axial portion;

a platy bendable valve portion formed thinner than the rigid axial portion and extending outward from the rigid axial portion; and a sealing lip portion extending inward from the rigid axial portion wherein;

the sealing lip portion comprises a first sealing lip which extends inward from the rigid axial portion up to substantially a same horizontal plane as the top end face of the rigid axial portion and the outer circumference face of the supporting portion, and a second sealing lip which extends inward from the rigid axial portion up to substantially a same horizontal plane as the bottom end face of the rigid axial portion and the outer circumference face of the supporting portion, and the each sealing lip comprises a substantially semi-circular seal effecting face provided at an edge thereof and an extending portion having substantially a same thickness as a diameter of the semi-circular shape, connecting the seal effecting face and the rigid axial portion.

8. The stop valve according to claim 7, wherein;

the extending portion of the first sealing lip and the extending portion of the second sealing lip are so formed that a gap is provided between each extending portion of the first and second sealing lips and an outer circumference face of the supporting portion when the first seal effecting face and the second seal effecting face are in contact with the outer circumference face of the supporting portion.

* * * * *